United States Patent [19]

Morgan et al.

[11] 4,277,146
[45] Jul. 7, 1981

[54] VISIBLE AND INFRARED INTENSITY LIMITER

[75] Inventors: Robert L. Morgan, Huntland, Tenn.; Larry T. Cupitt, Cary, N.C.; William L. Gamble, Huntsville, Ala.

[73] Assignee: The United States of America as represented by the Secretary of the Army, Washington, D.C.

[21] Appl. No.: 59,020

[22] Filed: Jul. 19, 1979

[51] Int. Cl.³ .............................................. G02F 1/03
[52] U.S. Cl. .................................................... 350/356
[58] Field of Search .............................. 350/356, 353; 331/94.5 Q, 94.5 M, 94.5 S

[56] References Cited

U.S. PATENT DOCUMENTS 3,780,296  12/1973  Waksberg .................. 331/94.5 S
4,071,751  1/1978  Waksberg .................. 331/94.5 S Primary Examiner—William L. Sikes
Assistant Examiner—Leon Scott, Jr.
Attorney, Agent, or Firm—Nathan Edelberg; Robert P. Gibson; Robert C. Sims

[57] ABSTRACT

The laser light is polarized and sent through an electro-optic pockels cell where it is phased shifted in a duty cycle in accordance with the amplitude intensity. The light is then sent through an analyzer which will act as an attenuator to regulate the final amplitude output of the light.

1 Claim, 4 Drawing Figures

VISIBLE AND INFRARED INTENSITY LIMITER

DEDICATORY CLAUSE

The invention described herein may be manufactured, used, and licensed by or for the Government for governmental purposes without the payment to us of any royalties thereon.

BACKGROUND OF THE INVENTION

This invention was developed primarily to limit the intensity amplitude excursions of pulsed gas lasers in the infrared region. These laser types have notoriously poor amplitude control, the best variation being approximately 30% pulse to pulse. Present methods for stabilizing the output of these devices consists in careful design of the pump source so that equal power is applied for each pulse. However, due to the statistical nature of population inversion mechanism, the inverted population is very seldom the same, giving rise to different numbers of light quanta radiated from the device. Even the best efforts of amplitude stabilization still result in approximately 5% amplitude variations of the radiation output. This invention can limit the amplitude variation to 0.1% or less. This small amplitude variation is necessary where the pulsed laser is to be used as an analytical probe laser to determine the gain of an optically active medium.

DESCRIPTION OF THE PREFERRED EMBODIMENT

Figure 1:
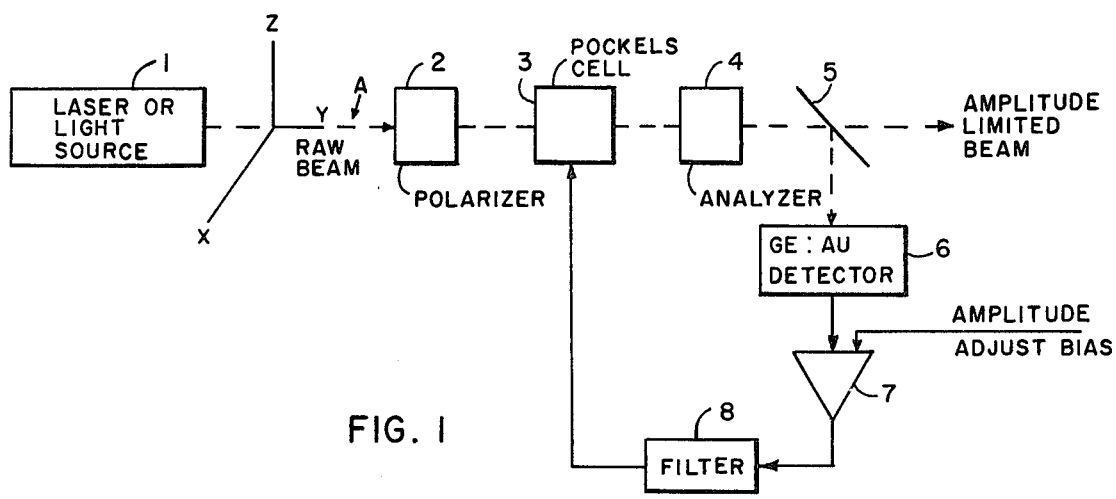
FIG. 1 is a block diagram illustrating the preferred embodiment of the present invention.

The invention consists of the parts in FIG. 1 labeled 2 through 8 inclusive and along with Part 1 are described as follows: Part 1 is a source of lights whose output is to regulate. Part 2 is the polarizer which plane polarizes the output raw beam in the z direction of the coordinate system. Part 3 is an electro-optic pockels cell of gallium arsenide for the 2-10 micron wavelength range (potassium dihydrogen phosphate can be used for visible wavelengths) which is aligned so that for zero impressed electric field from Part 8 its polarization direction is also in the z direction. Part 4 is the analyzer whose polarization direction is aligned in the z direction. Part 5 is an 8% reflectance mirror which directs a portion of the beam into Part 6 which is a gold doped germanium detector or indium antimonide detector for the 2 micron to 10 micron spectral region (a photomultiplier tube or a schottky barrier diode can be used for the visible region). Part 7 is a high gain wide band (10 megahertz) operational dc amplifier and Part 8 is a high frequency attenuation passive filter which is adjusted to keep the gain-phase from inclosing the unity gain point thereby preserving the stability of the feedback loop.

Figure 2:
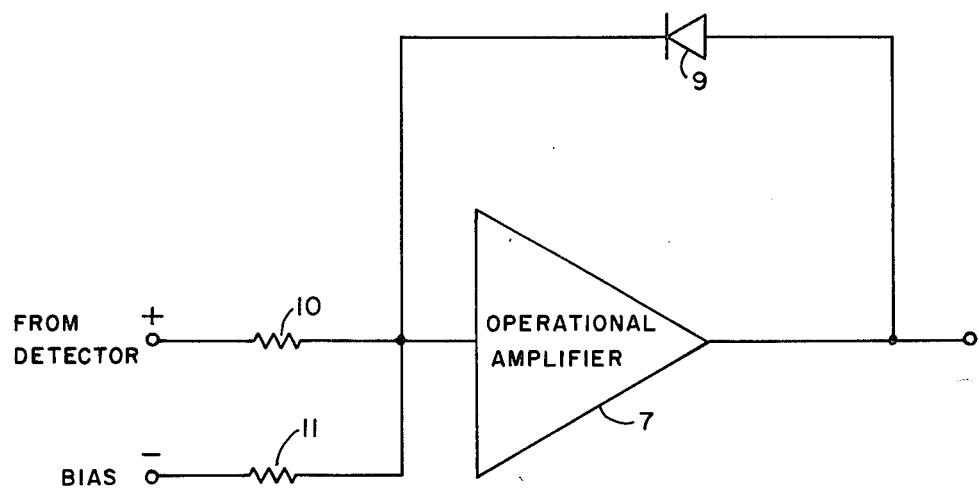
FIG. 2 is a schematic showing of the operation amplifier.
Figure 3:
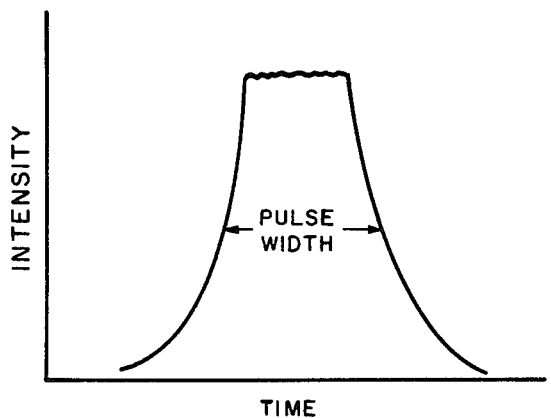
FIG. 3 is the waveform of the output of the device.
Figure 4:
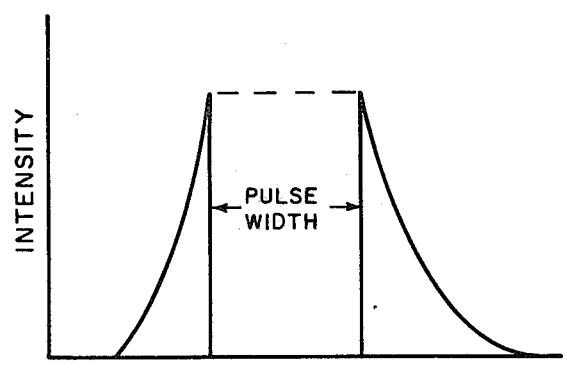
FIG. 4 is a waveform of the device if the mirror was placed at point A of FIG. 1.

The device operates in a manner to limit the amplitude of the laser of light source. The gold doped germanium detector 6 detects 8% of the radiation passing through Parts 2, 3, and 4 as reflected by mirror 5. The output detector 6 is fed to the high gain wide band operational amplifier 7, which has diode 9 feedback, as shown in FIG. 2, causing it to act as a small dead space, bidirectional switch. The output of amplifier 7 drives the passive filter 8 which acts to prevent high frequency oscillation while controlling the specific E field rotation of the pockels cell 3. The drive on the pockels cell 3 from network 8 causes cell 3 to rotate its E field transmission direction from the z direction toward the x direction a full 90 degrees. This rotation of the radiation E field 90 degrees is crossed to the transmission direction of the analyzer 4 which cuts the beam off. This action then causes the signal to amplifier 7 from detector 6 and resistor 10 (FIG. 3) to drop below the bias level from resistor II. Amplifier 7 then cuts off which by the preceding discussion causes part 3 to rotate E back to 0 degrees. Analyzer 4 will now pass the output from cell 3 and the cycle is repeated. With the high gain of the system this action causes the net effective rotation of the pockels cell to minutely oscillate about a preselected intensity amplitude point which corresponds to the bias input to amplifier 7. The output waveshape will be as shown in FIG. 3. If mirror 5 were placed at point A, the pulse output would be as shown in FIG. 4.

This device can be used to control the output of cw devices as well as the pulse devices, since the effective action is the same; however, the positioning of mirror 5 in position A would be remarkable, because it would maintain the device in a constant cutoff state. Part 7 could be any of the known high gain switching devices which would have an output only when the signal from detector 6 is greater than the signal from the bias source.

We claim:

1. A system for controlling the amplitude of laser light from a laser comprising: a polarizer for polarizing said light in a predetermined direction; an electro-optic pockels cell having a control input terminal; an analyzer being polarized such that it will pass electromagnetic energy polarized in said predetermined direction and will cut off electromagnetic energy polarized 90° to said predetermined direction; said polarizer, cell and analyzer being positioned such that the light will pass through said polarizer, cell and analyzer in that order; a partial reflector being positioned to reflect a portion of the light output passing through said analyzer; a germanium detector positioned to receive light reflected from said reflector; said detector having an output terminal which will have a signal thereon which is representative of the amplitude level of said laser light; a high gain switchable amplifier connected to the output terminal of said detector so as to provide a control signal when said laser light reaches a preselected intensity amplitude level; said high gain switchable amplifier produces a control signal only when said detector measures an amplitude level greater than said preselected level; a high frequency filter connected between the amplifier and the control input of said pockels cell; and the control signal being connected through the filter to the control input terminal of said cell so as to cause the cell to rotate the polarization of said electromagnetic energy 90° with respect to said predetermined direction.

* * * * *